United States Patent
Jacobs et al.

[11] Patent Number: 6,055,166
[45] Date of Patent: Apr. 25, 2000

[54] LOW TRICKLE CURRENT STARTUP BIAS CIRCUIT AND METHOD OF OPERATION THEREOF

[75] Inventors: Mark E. Jacobs, Dallas; Yimin Jiang; Vijayan J. Thottuvelil, both of Plano, all of Tex.

[73] Assignee: Lucent Technologies Inc., Murray Hill, N.J.

[21] Appl. No.: 09/193,042

[22] Filed: Nov. 16, 1998

[51] Int. Cl.[7] .................... H02M 1/14; H02M 7/125; H02M 5/42

[52] U.S. Cl. .................... 363/49; 363/53; 363/89; 323/901

[58] Field of Search .................... 363/49, 53, 44, 363/45, 89, 84, 901

[56] References Cited

U.S. PATENT DOCUMENTS

| | | | |
|---|---|---|---|
| 5,600,552 | 2/1997 | McCavit et al. | 363/89 |
| 5,661,642 | 8/1997 | Shimashita | 363/49 |
| 5,812,385 | 9/1998 | Leu | 363/49 |
| 5,880,942 | 3/1999 | Leu | 363/49 |
| 5,889,393 | 3/1999 | Wrathall | 323/282 |

*Primary Examiner*—Edward H. Tso
*Assistant Examiner*—Bao Q. Vu

[57] ABSTRACT

For use with a power converter having a power supply control circuit, a current startup bias circuit and a method of operating the same. In one embodiment, the circuit includes: (1) a charge reservoir that receives and stores a trickle current during a startup period of the power converter, a voltage of the charge reservoir increasing as the charge reservoir stores the trickle current and (2) a latch, coupled to the charge reservoir, that activates when the voltage reaches a threshold to couple the charge reservoir to the power supply control circuit and initiate operation thereof.

22 Claims, 5 Drawing Sheets

LOW TRICKLE CURRENT STARTUP BIAS CIRCUIT AND METHOD OF OPERATION THEREOF

TECHNICAL FIELD OF THE INVENTION

The present invention is directed, in general, to power conversion and, more specifically, to a low trickle current startup bias circuit for a power converter and a method of operating the same.

BACKGROUND OF THE INVENTION

Many applications require power supplies that operate either from AC voltage or DC voltage such as a battery, which may be located on the secondary side of the power supply. These power supplies may also be required to start up from the AC or the DC voltages as well. A conventional approach in such applications is to place a bias supply, which is needed in the power supply to control power and interface functions, on the secondary side of the power supply where a battery is located. A problem arises, in these situations, as to how to accomplish startup under AC voltage conditions when a battery may not be present.

Conventional AC or DC power supplies place the bias supply on the primary side of the power supply and provide the bias start function by using a current circuit that draws a small current typically of 10 to 50 milliamperes from an available DC high voltage bus. This DC high voltage bus is usually derived using passive components from the AC voltage input. The circuit usually consists of a diode rectifier arrangement connected directly to the AC voltage line. Sufficient current is drawn directly from this circuit to start the control and switching processes in the converter. This arrangement allows the normal bias supply to start and to provide bias power to all of the required bias loads. This type of current circuit is usually highly inefficient and is therefore disabled as soon as the power supply is operative.

However, when the bias supply is located on the secondary side of the power supply, an option to provide a DC voltage connection from the AC voltage input no longer exists, since this would compromise safety isolation requirements. The safety isolation requirements are quite severe in that an agency-recognized safety barrier must be established that sufficiently isolates the primary and secondary sides of the power supply from each other. This requirement circumvents significant primary side contamination in the event that the secondary side of a power supply should develop even a major fault condition. This requirement dictates that the fault impedance between the primary and secondary sides of the power supply be sufficiently large to limit any current to a maximum of about 500 micro amperes. This value is well below the typical current of 10 to 50 milliamperes required to operate current startup circuit arrangements.

Accordingly, what is needed in the art is an effective and efficient way to use the small currents afforded by barrier isolation impedances to initiate the operation of secondary side bias circuits.

SUMMARY OF THE INVENTION

To address the above-discussed deficiencies of the prior art, the present invention provides, for use with a power converter having a power supply control circuit, a current startup bias circuit and a method of operating the same. In one embodiment, the circuit includes: (1) a charge reservoir that receives and stores a trickle current during a startup period of the power converter, a voltage of the charge reservoir increasing as the charge reservoir stores the trickle current and (2) a latch, coupled to the charge reservoir, that activates when the voltage reaches a threshold to couple the charge reservoir to the power supply control circuit and initiate operation thereof.

As previously described, converter isolation requirements place severe restrictions on the amount of charge current that can be made available to bias a power supply control circuit when a converter is being started. The present invention addresses this restriction by accumulating and judiciously managing the limited charge current that is available during the startup period of a power converter to provide a bias to the converter's power supply control circuit, thereby eliminating the need for alternative sources of such charge current.

For purposes of the present discussion, "trickle current" is defined as being an electrical current that is insufficient to effect a suitable bias on a power supply control circuit for a power converter. In practice, such trickle current may be two or more orders of magnitude less than the suitable current required. For purposes of the present discussion, a converter's "startup period" begins with an initial command to provide power to the converter and ends when the converter's output voltage is within a specified operating range.

In one embodiment of the present invention, the charge reservoir receives the trickle current from a selected one of: (1) an AC input to the power converter and (2) a battery associated with the power converter. Those skilled in the pertinent art will understand that the trickle current can be derived from sources other than the two set forth above.

In one embodiment of the present invention, the charge reservoir is a capacitor. The present invention contemplates other devices for accumulating charge over time.

In one embodiment of the present invention, the latch comprises a zener diode that establishes the threshold. In an embodiment to be illustrated and described, the zener diode establishes the threshold at about 12 volts DC.

In one embodiment of the present invention, the latch comprises a feedback branch that maintains an activation of the latch. In a related embodiment, the latch comprises a first switch that activates a second switch when the voltage reaches the threshold. The second switch couples the charge reservoir to the power supply control circuit and maintains an activation of the first switch. In one variation of the embodiment, the first and second switches are metal oxide semiconductor field-effect transistors (MOSFETs).

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
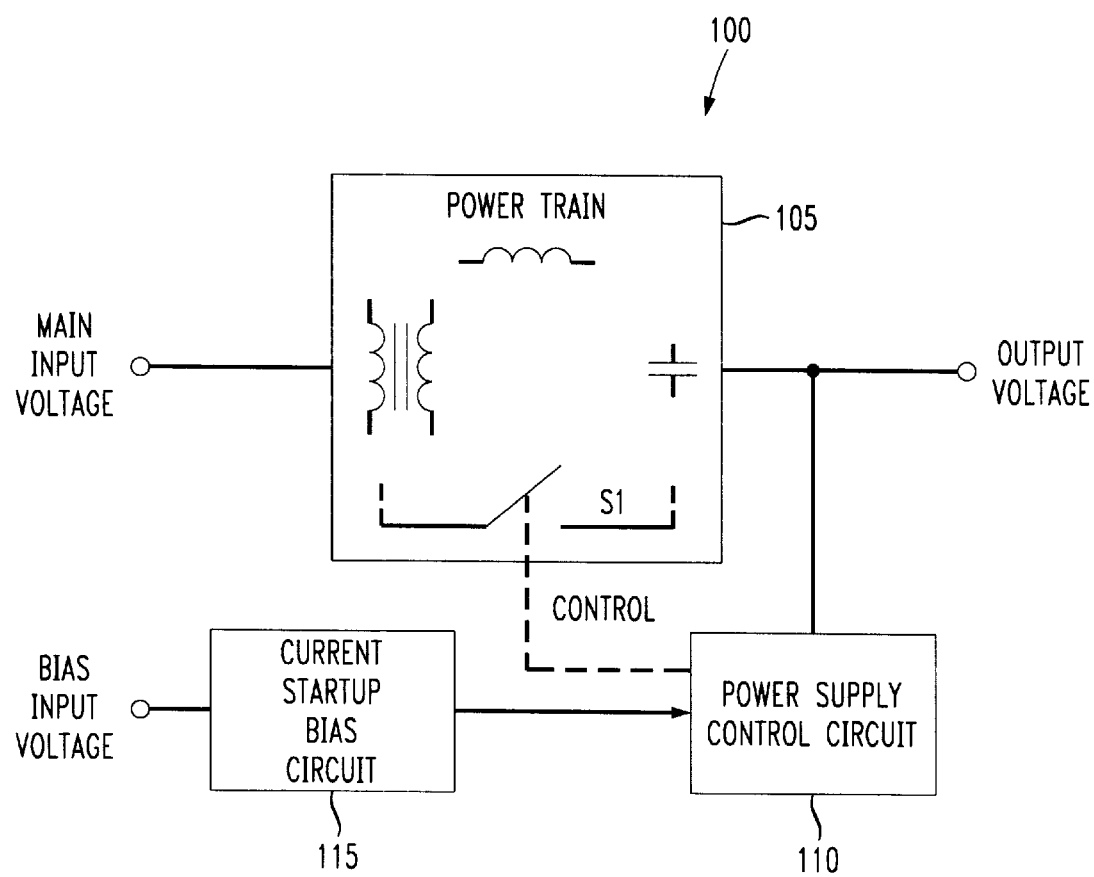
FIG. 1 illustrates a power converter that includes a power train and a power supply control circuit that cooperate with a current startup bias circuit constructed according to the principles of the present invention.

Referring initially to FIG. 1, illustrated is a power converter 100 that includes a power train 105 and a power supply control circuit 110 that cooperate with a current startup bias circuit 115 constructed according to the principles of the present invention. The power train 105 includes a controllable switch S1 that is coupled to the power supply control circuit 110 and that provides a drive waveform that establishes and regulates the output voltage of the power converter 100 to a required value. The power supply control circuit 110 may be a PWM controller, for example. The current startup bias circuit 115 provides the initial startup power to the power supply control circuit 110 during the startup period, thereby allowing for an orderly startup of the power converter 100.

The bias input voltage may be either an AC or DC voltage. The current startup bias supply 115 is located on the secondary side of input voltage for the power supply 100 in the illustrated embodiment. This requires that the bias input voltage for the current startup bias circuit 115 be sufficiently well isolated from the primary side of the input voltage to meet safety requirements. The required safety isolation dictates that the isolation devices be of an impedance sufficient to limit a possible fault current to a maximum of about 500 micro amperes. To operate properly, the power supply control circuit 110 typically may require 10 to 50 milliamperes at a supply voltage of 12 volts. Therefore, the current startup bias circuit 115, in the illustrated embodiment, collects and stores the charge provided by a trickle current of about 100 micro amperes and delivers it to the power supply control circuit 110 with a voltage and current sufficient for reliable startup operation. Once the startup period is complete, power for the power supply control circuit 110 is provided from the main input voltage.

Figure 2A:
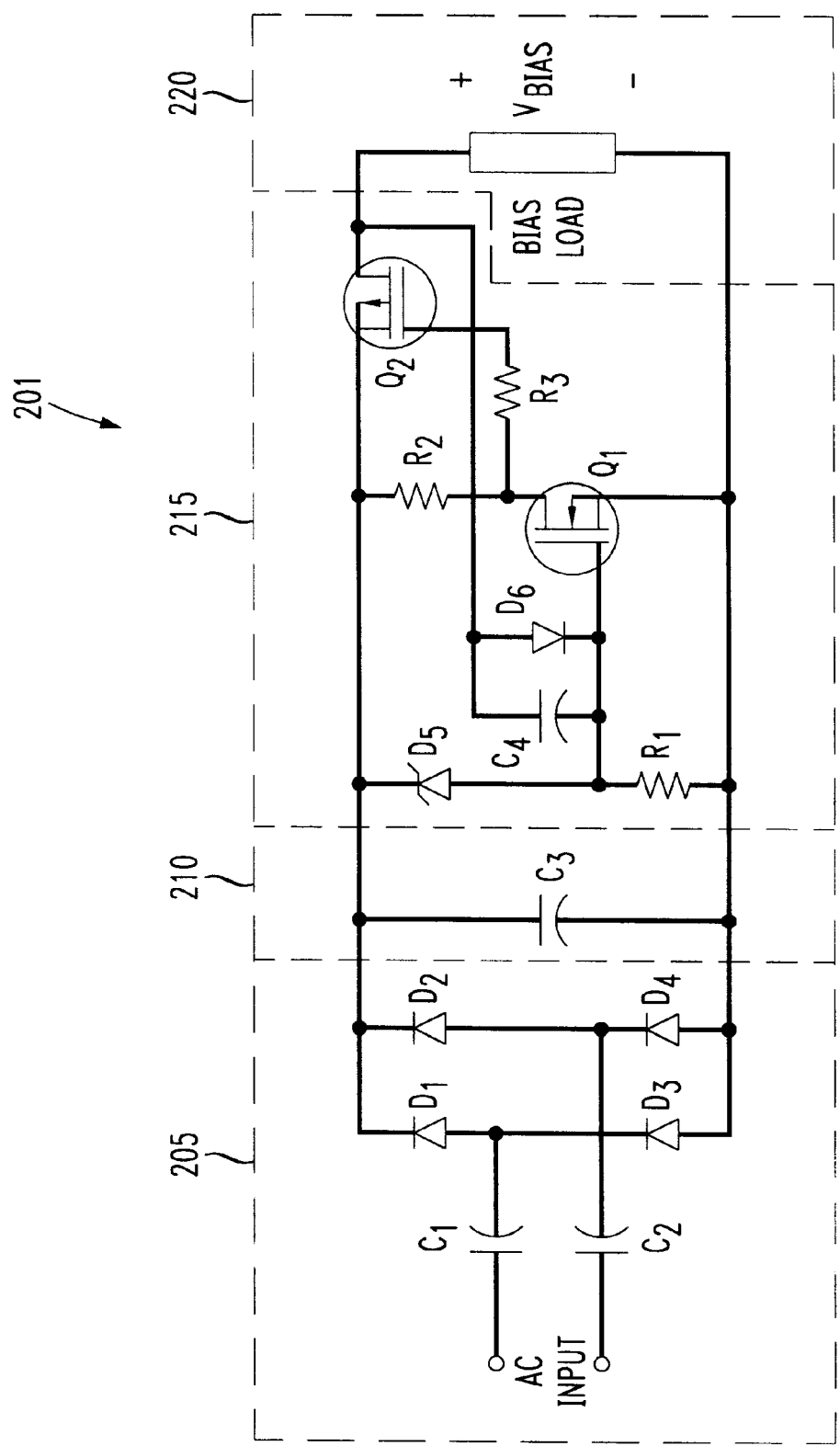
FIG. 2A illustrates a current startup bias circuit constructed according to the principles of the present invention.

Turning now to FIG. 2A, illustrated is a current startup bias circuit 201 constructed according to the principles of the present invention. The current startup bias circuit 201 can be substituted into the power supply 100 of FIG. 1 as the current startup bias circuit 115. The current startup bias circuit 201 includes an input circuit 205, a charge reservoir 210, a latch 215 and a bias load 220. The input circuit 205 accommodates an AC input voltage and includes first and second capacitors C1, C2 and a bridge rectifier with first, second, third and fourth diodes D1, D2, D3, D4. The charge reservoir 210 includes a third capacitor C3. The latch 215 includes a fifth diode D5 that is a zener diode, first, second and third resistors R1, R2, R3, a sixth diode D6, a fourth capacitor C4 and first and second switches Q1, Q2. The bias load 220 is representative of any generic load but typically would be of the same type as the power supply control circuit 110 of FIG. 1.

Converter isolation requirements place severe restrictions on the amount of charge current that can be made available to bias a power supply control circuit when a converter is being started. The present invention addresses this restriction by accumulating and judiciously managing the limited charge current that is available during the startup period of a power converter to provide a bias to the converter's power supply control circuit, thereby eliminating the need for alternative sources of such charge current.

The input circuit 205 delivers the trickle current to the charge reservoir 210 and provides sufficient isolation via the first and second capacitors C1, C2. The first and second capacitors C1, C2 are typically safety-rated Y capacitors having a value of 4.7 nanofarads in the illustrated embodiment. The charge reservoir 210 is the third capacitor C3, in the illustrated embodiment, that receives and stores the rectified trickle current from the input circuit 205, during a startup period of a power converter. The present invention contemplates other devices for accumulating charge over time, however. The rectified trickle current causes a voltage to increase across the third capacitor C3 thereby storing the charge associated with the trickle current in the charge reservoir 210.

The latch 215 is coupled to the charge reservoir 210 and activates when the voltage across the third capacitor C3 reaches a threshold. The latch then couples the charge reservoir 210 to the bias load 220, which may be a power supply control circuit to initiate its operation. The latch 215 comprises the fifth diode D5 that establishes the threshold at about 12 volts DC in this embodiment. Initially, both the first and second switches Q1, Q2 are OFF (not conducting). As the trickle charge voltage across the third capacitor C3 reaches about 12 volts the fifth diode D5 conducts, turning the first switch Q1 ON. This action causes a voltage drop across the second resistor R2, which in turn causes the second switch Q2 to turn ON. The condition of the second switch Q2 being ON delivers the charge reservoir 210 voltage across the third capacitor C3 to the bias load 220. The latch 215 also comprises a feedback branch that includes the sixth diode D6 and the fourth capacitor C4, which maintains activation of the latch 215. In the illustrated embodiment, the first and second switches Q1, Q2 are metal oxide semiconductor field-effect transistors (MOSFETs), where the first switch Q1 is an n-channel device, and the second switch Q2 is a p-channel device.

Figure 2B:
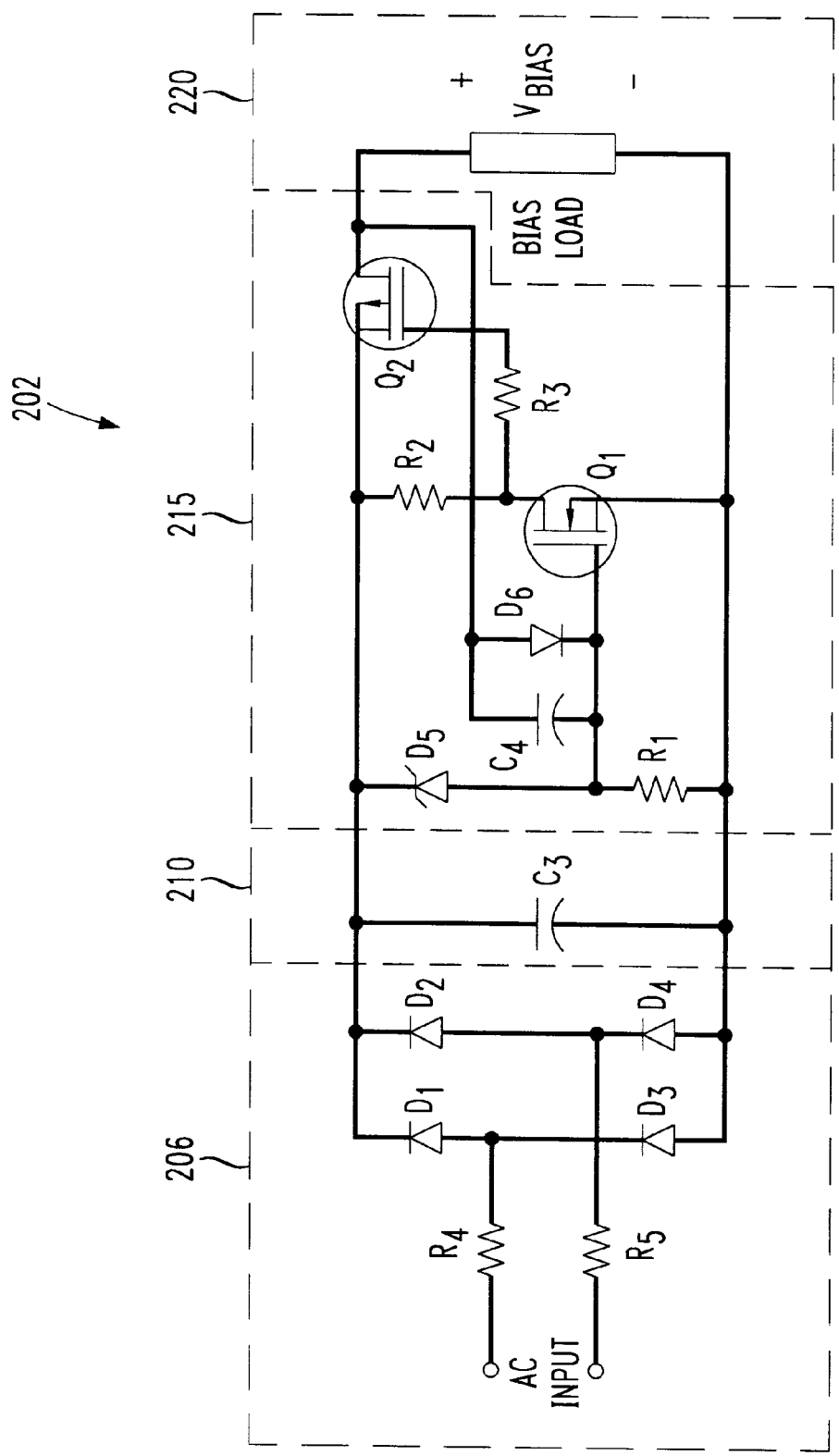
FIG. 2B illustrates an alternate current startup bias circuit constructed according to the principles of the present invention.

Turning now to FIG. 2B, illustrated is an alternate current startup bias circuit 202 constructed according to the principles of the present invention. The current startup bias circuit 202 can be substituted into the power supply 100 of FIG. 1 as the current startup bias circuit 115. The current startup bias circuit 202 includes an input circuit 206, a charge reservoir 210, a latch 215 and a bias load 220. The input circuit 206 also accommodates an AC input voltage and includes a fourth and fifth resistor R4, R5 and a bridge rectifier with first, second, third and fourth diodes D1, D2, D3, D4. In this embodiment, the fourth and fifth resistors R4, R5 provide the high impedance isolation required for safety and are sized to provide the amount of trickle current required. The charge reservoir 210, the latch 215 and the bias load 220 are shown to be the same as described in FIG. 2A.

Figure 2C:
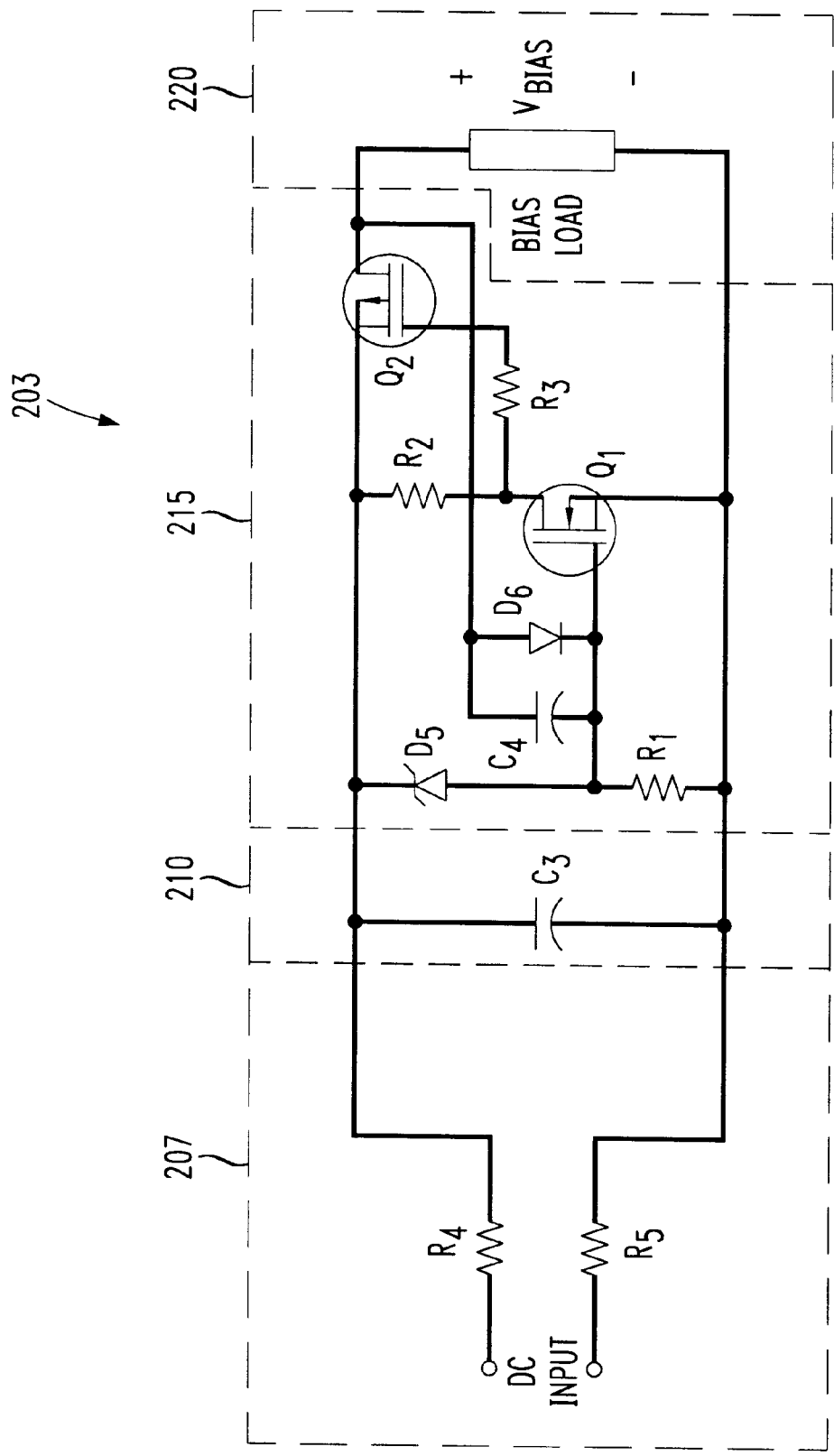
FIG. 2C illustrates another alternate current startup bias circuit constructed according to the principles of the present invention.

Turning now to FIG. 2C, illustrated is another alternate current startup bias circuit 203 constructed according to the principles of the present invention. The current startup bias circuit 203 can be substituted into the power supply 100 of FIG. 1 as the current startup bias circuit 115. The current startup bias circuit 203 includes an input circuit 207, a charge reservoir 210, a latch 215 and a bias load 220. The input circuit 207 accommodates a DC input voltage, which may be a battery and includes a fourth and fifth resistor R4, R5 In this embodiment, the fourth and fifth resistors R4, R5 also provide the high impedance isolation required for safety and are sized to provide the amount of trickle current required. The charge reservoir 210, the latch 215 and the bias load 220 may be the same as described in FIG. 2A.

Therefore, the charge reservoir 210 may receive the trickle current from a selected one of an AC input to the power converter or a battery associated with the power converter. Those skilled in the pertinent art will understand that the trickle current can be derived from sources other than the two set forth above.

Figure 3:
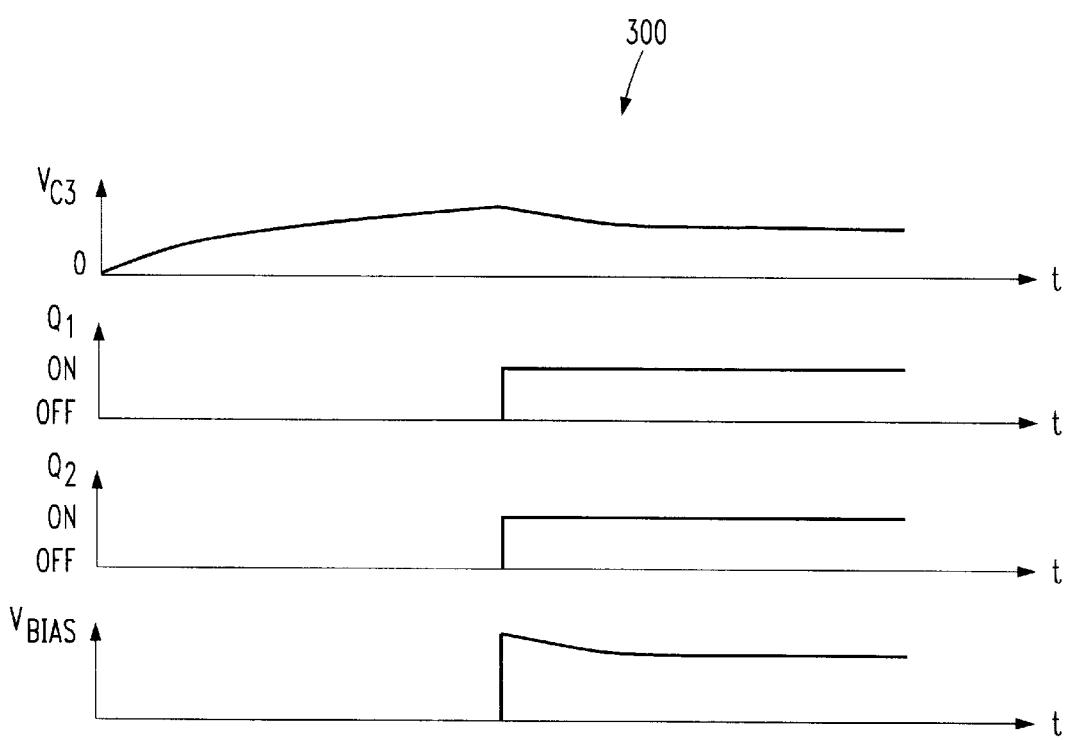
FIG. 3 illustrates a collection of waveforms for the current startup bias circuit of FIG. 2A.

Turning now to FIG. 3, illustrated is a collection of waveforms 300 for the current startup bias circuit 201 of FIG. 2A. The collection of waveforms 300 includes a voltage waveform Vc3, which is a voltage across the third capacitor C3, a voltage waveform Q1, which indicates a status of the first switch Q1, a voltage waveform Q2, which indicates a status of the second switch Q2 and a voltage waveform $V_{BIAS}$, which is a voltage across the bias load 220. The voltage waveform Vc3 begins to increase as a result of the trickle current being applied to the third capacitor C3. As the voltage across the third capacitor C3 reaches the threshold voltage, both the first and second switches Q1, Q2 turn ON causing the voltage waveform $V_{BIAS}$ to rise and follow the voltage waveform Vc3. Shortly after the second switch Q2 turns ON, the normal operation of the main power supply begins including its internal bias supply thereby eliminating the load on the third capacitor C3.

Although the present invention has been described in detail, those skilled in the art should understand that they can make various changes, substitutions and alterations herein without departing from the spirit and scope of the invention in its broadest form.

What is claimed is:

1. For use with a power converter couplable to a load, a current startup bias circuit, comprising:
    a charge reservoir that receives and stores a trickle current during a startup period of said power converter, a voltage of said charge reservoir increasing as said charge reservoir stores said trickle current; and
    a latch, coupled to said charge reservoir, that activates when said voltage reaches a threshold to couple said charge reservoir to said load and initiate operation thereof.

2. The circuit as recited in claim 1 wherein said charge reservoir receives said trickle current from a selected one of:
    an AC input to said power converter, and
    a battery associated with said power converter.

3. The circuit as recited in claim 1 wherein said charge reservoir is a capacitor.

4. The circuit as recited in claim 1 wherein said latch comprises a zener diode that establishes said threshold.

5. The circuit as recited in claim 1 wherein said latch comprises a feedback branch that maintains an activation of said latch.

6. The circuit as recited in claim 1 wherein said latch comprises a first switch that activates a second switch when said voltage reaches said threshold, said second switch coupling said charge reservoir to said load and maintaining an activation of said first switch.

7. The circuit as recited in claim 6 wherein said first and second switches are metal oxide semiconductor field-effect transistors (MOSFETs).

8. A method of operating a current startup bias circuit to start a power converter couplable to a load, comprising:
    storing a trickle current in a charge reservoir during a startup period of said power converter, a voltage of said charge reservoir increasing as said charge reservoir stores said trickle current; and
    coupling said charge reservoir to said load to initiate operation thereof when said voltage reaches a threshold.

9. The method as recited in claim 8 wherein said storing comprises receiving said trickle current from a selected one of:
    an AC input to said power converter, and
    a battery associated with said power converter.

10. The method as recited in claim 8 wherein said charge reservoir is a capacitor.

11. The method as recited in claim 8 further comprising establishing said threshold with a zener diode.

12. The method as recited in claim 8 further comprising maintaining said coupling.

13. The method as recited claim 8 further comprising:
    employing a first switch to activate a second switch when said voltage reaches said threshold; and
    employing said second switch to couple said charge reservoir to said load and maintain an activation of said first switch.

14. The method as recited in claim 13 wherein said first and second switches are metal oxide semiconductor field-effect transistors (MOSFETs).

15. A power converter, comprising:
    a power train having a controllable switch;
    a power supply control circuit coupled to said controllable switch to provide a drive waveform thereto; and
    a current startup bias circuit coupled to said power supply control circuit and including:
        a charge reservoir that receives and stores a trickle current during a startup period of said power converter, a voltage of said charge reservoir increasing as said charge reservoir stores said trickle current, and
        a latch, coupled to said charge reservoir, that activates when said voltage reaches a threshold to couple said charge reservoir to said power supply control circuit and initiate operation thereof.

16. The converter as recited in claim 15 wherein said charge reservoir receives said trickle current from a selected one of:
    an AC input to said power converter, and
    a battery associated with said power converter.

17. The converter as recited in claim 15 wherein said charge reservoir is a capacitor.

18. The converter as recited in claim 15 wherein said latch comprises a zener diode that establishes said threshold.

19. The converter as recited in claim 15 wherein said latch comprises a feedback branch that maintains an activation of said latch.

20. The converter as recited in claim 15 wherein said latch comprises a first switch that activates a second switch when said voltage reaches said threshold, said second switch coupling said charge reservoir to said power supply control circuit and maintaining an activation of said first switch.

21. The converter as recited in claim 20 wherein said first and second switches are metal oxide semiconductor field-effect transistors (MOSFETs).

22. The converter as recited in claim 15 wherein said power supply control circuit is a pulse-width modulator (PWM).

* * * * *